United States Patent
Martin, III et al.

(10) Patent No.: US 8,579,088 B2
(45) Date of Patent: Nov. 12, 2013

(54) DRAIN PLUG FOR CARRIER ASSEMBLY

(75) Inventors: Robert J. Martin, III, Newark, OH (US); Brian David Hayes, Newark, OH (US)

(73) Assignee: Arvinmeritor Technology, LLC, Troy, MI (US)

( * ) Notice: Subject to any disclaimer, the term of this patent is extended or adjusted under 35 U.S.C. 154(b) by 1380 days.

(21) Appl. No.: 11/782,685

(22) Filed: Jul. 25, 2007

(65) Prior Publication Data
US 2009/0026014 A1    Jan. 29, 2009

(51) Int. Cl.
*F16H 57/04* (2010.01)
(52) U.S. Cl.
USPC .............. 184/6.12; 184/106; 138/46; 74/607; 74/606 A
(58) Field of Classification Search
USPC ........ 184/1.5, 6.12, 11.2, 105.3, 106; 138/42, 138/46; 251/264, 274, 339, 216; 74/606 R, 74/607, 606 A
See application file for complete search history.

(56) References Cited

U.S. PATENT DOCUMENTS

| | | | | |
|---|---|---|---|---|
| 1,220,810 A | * | 3/1917 | Alquist | 184/6.12 |
| 1,247,276 A | * | 11/1917 | Hurlburt | 184/6.12 |
| 3,625,310 A | * | 12/1971 | Herrick | 184/6.12 |
| 4,240,524 A | * | 12/1980 | Katayama et al. | 184/6.12 |
| 4,418,723 A | * | 12/1983 | Koni et al. | 138/42 |
| 4,721,184 A | * | 1/1988 | Sowards | 184/6.12 |
| 5,072,784 A | * | 12/1991 | Stenlund | 165/47 |
| 6,234,136 B1 | * | 5/2001 | Choi et al. | 123/195 C |

* cited by examiner

*Primary Examiner* — David D Le
*Assistant Examiner* — Terry Chau
(74) *Attorney, Agent, or Firm* — Brooks Kushman P.C.

(57) ABSTRACT

A drain plug for a carrier assembly is used to control fluid flow from a reservoir to a sump. The carrier assembly includes a carrier housing with an internal cavity that houses a gear assembly. The sump is located within the internal cavity to lubricate the gear assembly. The reservoir is separated from the sump by a channel. The drain plug is attached to the carrier housing, and extends into the channel, to provide a fluid flow restriction between the reservoir and the sump.

21 Claims, 2 Drawing Sheets

DRAIN PLUG FOR CARRIER ASSEMBLY

TECHNICAL FIELD

The subject invention relates to a drain plug that is used to control fluid flow within a carrier assembly.

BACKGROUND OF THE INVENTION

Carrier assemblies for drive axles include a carrier housing with an internal cavity that receives a gear assembly. The gear assembly drives output shafts, which in turn are coupled to drive vehicle wheels. The gear assembly must be properly lubricated to avoid premature wear and failure. The internal cavity is filled with to certain level with lubricating fluid, which lubricates the gear assembly as gear components rotate within the internal cavity. A drain plug is installed within the carrier housing at the internal cavity to allow lubricating fluid to be filled into, and drained from, the internal cavity.

One problem with current configurations is efficiency losses at the gear assembly that result from churning of the lubricating fluid. Further, excessive churning of the lubricating fluid causes foaming of the fluid and can lead to inadequate lubrication coverage for gear components, resulting in premature wear. The effects of churning losses are even greater when narrow package carrier configurations are used.

Thus, there is a need for an improved lubricating method and apparatus for a carrier assembly that avoids the problems set forth above.

SUMMARY OF THE INVENTION

A drain plug is used to control fluid flow from a reservoir to a sump in a carrier assembly. A diameter of the drain plug can also be changed if needed to adjust a rate of fluid flow between the reservoir and sump.

In one example, the carrier assembly includes a carrier housing with an internal cavity that houses a gear assembly. The sump is located within the internal cavity to lubricate the gear assembly. The reservoir is separated from the sump by a channel. The drain plug is attached to the carrier housing, and extends into the channel to provide a fluid flow restriction between the reservoir and the sump.

In one example, the drain plug comprises a threaded fastener with a body portion that extends from an enlarged head to a threaded distal end. The body portion extends across the channel and the threaded distal end is threaded into a housing wall portion.

In one disclosed embodiment, the carrier housing includes an inner wall portion and an outer wall portion. The inner wall portion defines the sump and the reservoir is formed between the inner and outer wall portions. The inner wall portion includes an extension portion that extends outwardly toward the outer wall portion to define a portion of the channel. The drain plug extends across the channel and is threaded into the extension portion.

As discussed above, the drain plug can be changed to adjust a rate of fluid flow between the reservoir and sump. Thus, a plurality of drain plugs can be provided, with each drain plug having a different diameter. Smaller diameter drain plugs allow for higher fluid flow rates and larger diameter drain plugs provide a greater restriction and thus a lower fluid flow rate. One drain plug is selected to provide a desired flow rate based on the diameter. This drain plug is then installed within the carrier housing to provide the desired flow rate.

By using a reservoir area that is separate from the sump that houses rotating components, sufficient fill is provided and churning losses are reduced. Further, a controlled drain back to a main cavity via the drain plug allows a high running level to feed other lubricating passages, such as bearing passages for example. These and other features of the present invention can be best understood from the following specification and drawings, the following of which is a brief description.

DETAILED DESCRIPTION OF THE PREFERRED EMBODIMENT

Figure 1:
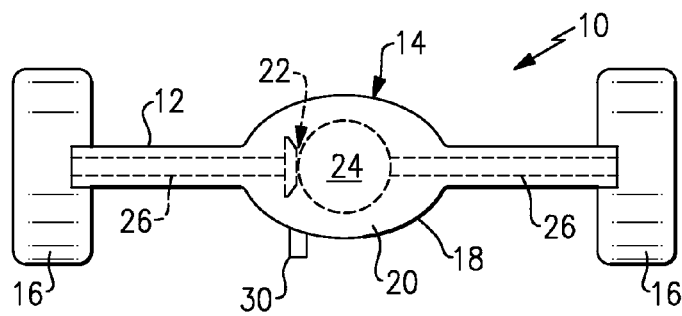
FIG. 1 is a schematic view of an axle and a carrier assembly incorporating the subject invention.

A drive axle 10, shown in FIG. 1, includes an axle housing 12 with a carrier 14 that is used to drive a pair of laterally spaced vehicle wheels 16. The carrier 14 includes a carrier housing 18 that can be formed as part of the axle housing 12 or which can be a separate housing that is attached to the axle housing 12. The carrier housing 18 defines an internal cavity 20 that receives a gear assembly 22. In the example shown, the gear assembly 22 comprises a differential 24 (shown schematically) that receives driving input from a ring and pinion gear set (not shown). The differential 24 is coupled to drive a pair of axle shafts 26, which in turn drive the vehicle wheels 16.

The internal cavity 20 is partially filled with a lubricating fluid to lubricate the gear assembly 22. A drain plug 30 is mounted to the carrier housing 18 to allow the lubricating fluid to be drained from the carrier housing 18. The drain plug 30 and carrier housing 18 are configured to reduce churning losses while still providing sufficient lubrication to the gear assembly 22. It should be understood that while the drain plug 30 and carrier 14 are shown as part of a rigid drive axle with an axle housing 12 extending between vehicle wheels 16, the subject drain plug and carrier could be utilized in many other axle configurations, such as sub-frame mounted carrier as used in an independent suspension configuration for example.

Figure 2A:
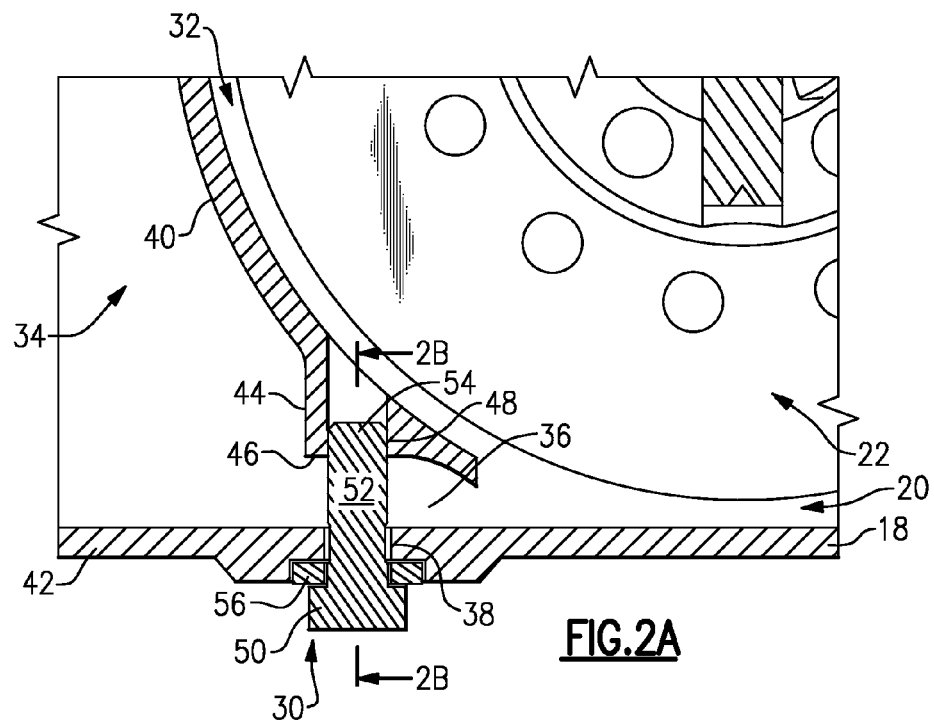
FIG. 2A is a cross-sectional view showing a drain plug installed in the carrier assembly.
Figure 2B:
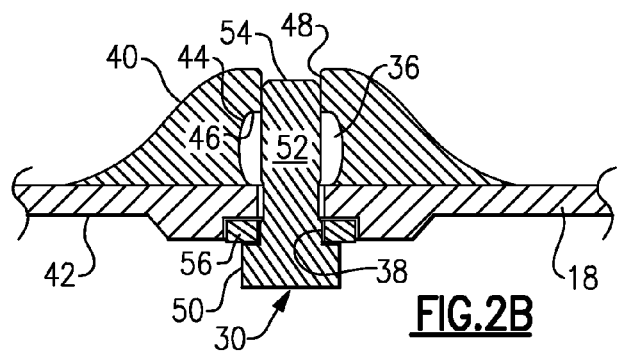
FIG. 2B is another view according to the section shown in FIG. 2A.

The drain plug 30 and carrier 14 are shown in greater detail in FIGS. 2A and 2B. The internal cavity 20 of the carrier housing 18 is compartmentalized to form a sump 32 and a reservoir 34 that are separate from each other. The gear assembly 22 is located within the sump 32, which receives lubricating fluid from the reservoir 34 via a channel 36. The sump 32 and reservoir 34 can be drained from a common drain hole 38 into which the drain plug 30 is inserted. The drain hole 38 is located at the channel 36 such that the reservoir 34 and sump 32 have equal access to the drain hole 38.

The carrier housing 18 includes an inner wall 40 that surrounds at least a portion of the gear assembly 22 to define a sump area. The carrier housing 18 also includes an outer wall 42 that is spaced apart from the inner wall 40 to define the reservoir 34. The distance between the inner wall 40 and outer wall 42 is increased at the reservoir 34, and this distance narrows as the inner 40 and outer 42 walls converge toward the channel 36. The outer wall 42 includes the drain hole 38 into which the drain plug 30 is inserted.

The inner wall 40 includes an extension portion 44 that extends away from the gear assembly 22 and toward the outer wall 42. The extension portion 44 extends to a distal end 46 that is spaced apart from the outer wall 42 by a gap to form a portion of the channel 36. The extension portion 44 includes a bore 48 that is aligned with the drain hole 38. In the example shown, the drain plug 30 extends entirely across the channel 36 and is received within the bore 48 to provide a fluid flow restriction in the channel 36. Bore 48 could be a threaded or unthreaded bore.

In the example shown, the drain plug 30 comprises a fastener or similar member that has an enlarged head portion 50 and a body portion 52 that extends to a distal end 54. At least the distal end 54 includes a threaded surface such that the distal end 54 can be threaded into the bore 48; however, the entire body portion 52 could comprise a threaded surface. The lubricating fluid flows through the channel 36 and around an outer surface of the body portion 52 between the reservoir 34 and the sump 32. A washer and/or seal member 56 is positioned between the outer wall 42 and the enlarged head portion 50. The body portion 52 is defined by a diameter, which can be varied to change the fluid flow through the channel 36. This will be discussed in greater detail below.

Figure 3:
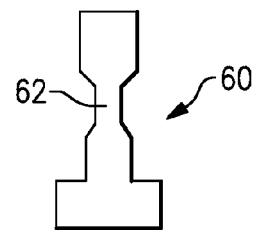
FIG. 3 shows another example of a drain plug.

As can be appreciated from FIG. 2B, the amount of fluid flow restriction within the channel 36 can be adjusted as needed to increase or decrease fluid flow from the reservoir 34 to the sump 32. In one example, drain plugs 30 having different body diameters are utilized to provide a desired fluid flow rate. Drain plugs 30 with larger body diameters, such as that shown in FIGS. 2A and 2B, provide a greater restriction than a drain plug 60 having a smaller body diameter, such as that shown in FIG. 3 for example. Further, drain plugs with variable body diameters, such as that shown in FIG. 3, could also be used to vary fluid flow. The drain plug 60 could be threadably adjusted within the carrier housing 18 to position a narrowed body portion 62 of the drain plug 60 at a desired location within the channel 36. One drain plug is selected from a plurality of drain plugs based on the body diameter that will provide the desired flow rate. The drain plug is then installed within the carrier housing 18. If the drain plug has a variable body diameter, the position of the drain plug can then be additionally adjusted to vary fluid flow rate if needed.

Figure 4A:
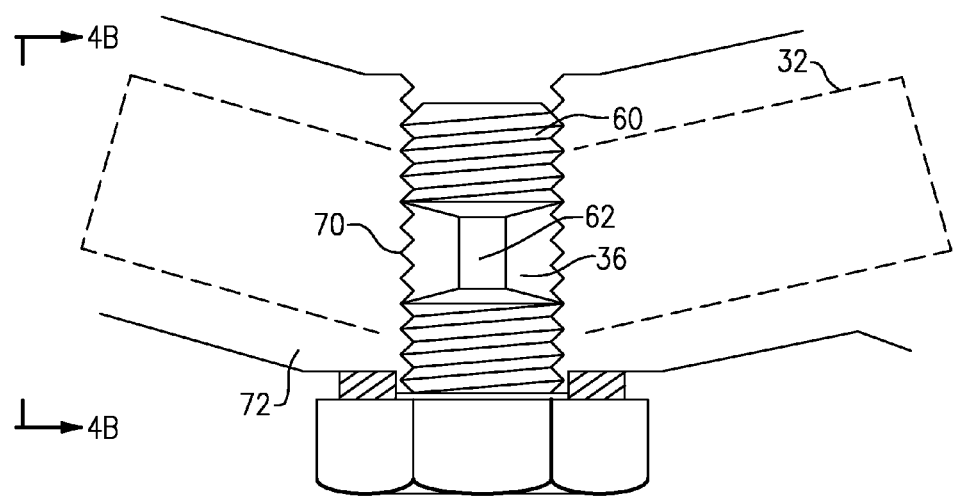
FIG. 4A is another example of a drain plug configuration.
Figure 4B:
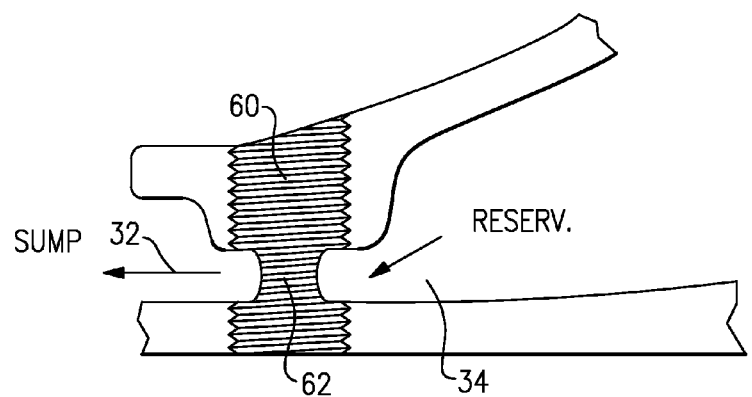
FIG. 4B is a view of FIG. 4A as indicated by section lines 4B-4B.

Another example configuration is shown in FIGS. 4A and 4B. In this example, a straight tapped hole is formed in wall 72 and the drain plug 60 with the narrowed body portion 62 is installed. Thus, the channel 36 is formed only by a variable central diameter of the drain plug 60. The sump 32 is on one side of the channel 36 and the reservoir 34 is on an opposite side as shown in FIG. 4B.

The drain plug and carrier housing configuration is especially useful for carriers having a narrow packaging width such as that used with an independent suspension. In one example, the carrier has a lateral width that is 500 millimeters or less. In such a configuration, using a reservoir area that is separate from a sump area that houses rotating components allows for sufficient fill while reducing the churning losses. Further, a controlled drain-back to the main internal cavity, which is achieved via the drain plug, allows for a high running lubrication level in the reservoir that can feed other lubricating passages, such as bearing passages for example. Also, when the reservoir has a high lubrication level, the sump level is reduced, which lessens the amount of oil churned by the spinning gear.

Another advantage with this configuration is that because the sump and reservoir are connected with the channel, stationary fluid levels are the same. This allows the use of a single fill plug to fill and check the levels.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A carrier assembly comprising:
   a carrier housing defining an internal cavity that receives a gear assembly, said carrier housing including an inner wall portion that extends at least partially around the gear assembly and an outer wall portion;
   a sump located within said internal cavity at the gear assembly wherein said inner wall portion extends around the gear assembly to substantially enclose said sump;
   a reservoir located within said internal cavity for holding a lubricating fluid, said reservoir being separate from said sump and located between said inner and said outer wall portions;
   a drain plug attached to said carrier housing, said drain plug controlling fluid flow of the lubricating fluid between said reservoir and said sump; and
   a channel extending along said outer wall portion between said reservoir and said sump, said drain plug having a body portion that extends into said channel.

2. The carrier assembly according to claim 1 wherein said inner wall portion includes an axial extension portion that extends outwardly toward said outer wall in a first direction to a distal end, said distal end being spaced apart from said outer wall to form at least a portion of said channel which extends in a second direction transverse to said first direction.

3. The carrier assembly according to claim 2 wherein said axial extension portion includes a first bore that extends into said inner wall portion and wherein said outer wall portion includes a second bore aligned with said first bore, said body portion of said drain plug extending through said second bore, across said channel, and into said first bore.

4. The carrier assembly according to claim 3 wherein said body portion extends to a threaded distal end that is threaded into said first bore.

5. The carrier assembly according to claim 4 wherein said body portion extends to an enlarged head portion located externally to said outer wall portion, and wherein a diameter of said body portion is varied to form a variable cross-section portion of said body portion which controls an amount of lubricating fluid that can flow through said channel from said reservoir to said sump, and wherein said variable cross-section portion is located within said channel during rotation of the gear assembly.

6. The carrier assembly according to claim 1 wherein said reservoir is separated from said sump by said channel, and wherein said drain plug comprises a threaded member that extends across said channel to restrict fluid flow from said reservoir to said sump during operation of said gear assembly by directing fluid from said reservoir around an outer surface of said drain plug, through said channel, and into said sump.

7. The carrier assembly according to claim 6 wherein said threaded member includes a reduced body portion and wherein said channel is formed only at the reduced body portion.

8. The carrier assembly according to claim 6 wherein said drain plug is selectable from a plurality of drain plugs each having a central body defined by a different diameter, and wherein one drain plug is selected from said plurality of drain plugs by selecting a desired diameter, said one drain plug being installed within said carrier housing to provide a desired fluid flow rate from said reservoir to said sump.

9. The carrier assembly according to claim 1 wherein said reservoir and said sump drain from a common opening when said drain plug is removed from said carrier housing.

10. The carrier assembly according to claim 1 wherein said channel is defined between an inwardly facing surface of said outer wall portion and an outwardly facing surface of said inner wall portion between said reservoir and said sump.

11. The carrier assembly according to claim 10 wherein said drain plug comprises a body that extends across said channel with fluid flowing around an outer surface of said body in a generally circumferential direction along an outer circumferential surface of the gear assembly from said reservoir, through said channel, and into said sump as the gear assembly rotates.

12. The carrier assembly according to claim 1 wherein said drain plug is positioned adjacent an outer circumferential edge portion of the gear assembly such that said drain plug is offset from a center of the gear assembly.

13. The carrier assembly according to claim 12 wherein the gear assembly rotates about a gear axis and wherein said drain plug comprises a body member that extends from a head portion to a distal end along a drain plug axis that does not intersect said gear axis.

14. A carrier assembly comprising:
a carrier housing defining an internal cavity that receives a gear assembly, said carrier housing including an inner wall portion that extends at least partially around the gear assembly and an outer wall portion;
a sump located within said internal cavity at the gear assembly wherein said inner wall portion extends around the gear assembly to substantially enclose said sump;
a reservoir located within said carrier housing between said inner and said outer wall portions for holding a lubricating fluid, said reservoir being separated from said sump by a channel extending along an inwardly facing surface of said outer wall portion and an outwardly facing surface of said inner wall portion between said reservoir and said sump; and
a drain plug attached to said carrier housing, said drain plug including a body member that extends into said channel to restrict fluid flow from said reservoir to said sump.

15. The carrier assembly according to claim 14 wherein said body member extends entirely across said channel with lubricating fluid flowing around said body member between channel walls and an outer surface of said body member wherein said channel walls comprise said inwardly facing surface of said outer wall portion and said outwardly facing surface of said inner wall portion.

16. The carrier assembly according to claim 14 wherein said drain plug comprises a body that extends across said channel with fluid flowing around an outer surface of said body in a generally circumferential direction along an outer circumferential surface of the gear assembly from said reservoir, through said channel, and into said sump as the gear assembly rotates.

17. The carrier assembly according to claim 14 wherein the gear assembly rotates about a gear axis and wherein said drain plug comprises a body member that extends from a head portion to a distal end along a drain plug axis that does not intersect said gear axis.

18. The carrier assembly according to claim 14 wherein said drain plug includes a body portion having a variable cross-section portion formed between a head portion and a distal end, and wherein said variable cross-section portion is located within said channel during rotation of the gear assembly.

19. A carrier assembly comprising:
a carrier housing defining an internal cavity that receives a gear assembly;
a sump located within said internal cavity at the gear assembly;
a reservoir located within said internal cavity for holding a lubricating fluid, said reservoir being separate from said sump;
a drain plug attached to said carrier housing, said drain plug controlling fluid flow of the lubricating fluid between said reservoir and said sump by directing fluid flow around an outer surface of said drain plug in a generally circumferential direction along an outer circumferential surface of the gear assembly from said reservoir and into said sump as the gear assembly rotates; and
wherein said carrier housing includes an inner wall portion that extends at least partially around the gear assembly to form said sump and an outer wall portion that cooperates with said inner wall portion to form said reservoir, and including a channel extending along an inwardly facing surface of said outer wall portion and an outwardly facing surface of said inner wall portion between said reservoir and said sump, and wherein said drain plug extends into said channel.

20. The carrier assembly according to claim 19 wherein said inner wall portion is defined by a variable cross-section including an axial extension portion that extends outwardly toward said outer wall to a distal end, said distal end being spaced apart from said outer wall portion to form at least a portion of said channel, and wherein said axial extension portion includes a first bore that extends into said inner wall portion and wherein said outer wall portion includes a second bore aligned with said first bore, said drain plug extending through said second bore, across said channel, and into said first bore.

21. The carrier assembly according to claim 19 wherein said drain plug includes a body portion having a variable cross-section portion between a head portion and a distal end, and wherein said variable cross-section portion is located within said channel during rotation of the gear assembly.

* * * * *